United States Patent
Cheng et al.

(10) Patent No.: US 11,120,535 B2
(45) Date of Patent: Sep. 14, 2021

(54) IMAGE PROCESSING METHOD, APPARATUS, TERMINAL, AND STORAGE MEDIUM

(71) Applicant: Tencent Technology (Shenzhen) Company Limited, Shenzhen (CN)

(72) Inventors: Pei Cheng, Shenzhen (CN); Bin Fu, Shenzhen (CN); Mengren Qian, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 69 days.

(21) Appl. No.: 16/583,025

(22) Filed: Sep. 25, 2019

(65) Prior Publication Data

US 2020/0020089 A1     Jan. 16, 2020

Related U.S. Application Data

(63) Continuation of application No. PCT/CN2017/106679, filed on Oct. 18, 2017.

(51) Int. Cl.
*G06T 5/50* (2006.01)
*G06T 7/73* (2017.01)
(Continued)

(52) U.S. Cl.
CPC ............ *G06T 5/50* (2013.01); *G06K 9/00275* (2013.01); *G06K 9/4609* (2013.01); *G06K 9/629* (2013.01); *G06T 7/75* (2017.01)

(58) Field of Classification Search
CPC ............ G06K 9/00248; G06K 9/00281; G06T 2207/20221
See application file for complete search history.

(56) References Cited

U.S. PATENT DOCUMENTS 9,558,396 B2    1/2017 Feng et al.
2002/0024519 A1   2/2002 Park
(Continued)

FOREIGN PATENT DOCUMENTS

CN        1477852 A    2/2004
CN      101008981 A    8/2007
(Continued)

OTHER PUBLICATIONS

Tencent Technology, WO, PCT/CN2017/106679, Jul. 9, 2018, 4 pgs.

(Continued)

*Primary Examiner* — Ross Vamdell
(74) *Attorney, Agent, or Firm* — Morgan, Lewis & Bockius LLP

(57) ABSTRACT

The present disclosure provides an image processing method, including: recognizing a source object in a source image, and determining, according to feature points of the source object, an orientation and a size of the source object; adjusting, according to matching relationships between the orientation and the size of the source object and the orientation and the size of the target object, the orientation and the size of the source object; adjusting a shape of the source object and a shape of the target object according to an average shape of the source object and an average shape of the target object; and fusing, in real time, the source image and the target image in a manner of aligning the shape of the source object with the shape of the target object.

20 Claims, 14 Drawing Sheets

(51) Int. Cl.
*G06K 9/00* (2006.01)
*G06K 9/46* (2006.01)
*G06K 9/62* (2006.01)

(56) References Cited

U.S. PATENT DOCUMENTS

2014/0079319 A1* 3/2014 Lin .................. G06T 5/007
       382/167
2015/0110349 A1   4/2015 Feng et al.
2015/0309569 A1* 10/2015 Kohlhoff ............ G06F 3/04842
       345/156
2018/0204052 A1*  7/2018 Li ................... G06K 9/6206

FOREIGN PATENT DOCUMENTS

| CN | 101098241 A | 1/2008 |
| --- | --- | --- |
| CN | 101377814 A | 3/2009 |
| CN | 101770649 A | 7/2010 |
| CN | 103218775 A | 7/2013 |
| CN | 103577815 A | 2/2014 |
| CN | 104079429 A | 10/2014 |
| CN | 104331915 A | 2/2015 |
| CN | 104424624 A | 3/2015 |
| CN | 105741229 A | 7/2016 |
| CN | 106056650 A | 10/2016 |
| CN | 106156730 A | 11/2016 |
| CN | 106780658 A | 5/2017 |
| CN | 107038683 A | 8/2017 |
| CN | 107146199 A | 9/2017 |
| CN | 107231529 A | 10/2017 |

OTHER PUBLICATIONS

Tencent Technology, IPRP, PCT/CN2017/106679, Apr. 21, 2020, 5 pgs.
Tencent Technology, ISR, PCT/CN2017/106679, Jul. 9, 2018, 3 pgs.

* cited by examiner

IMAGE PROCESSING METHOD, APPARATUS, TERMINAL, AND STORAGE MEDIUM

CROSS-REFERENCE TO RELATED APPLICATION

This application is a continuation application of PCT/CN2017/106679, entitled "IMAGE PROCESSING METHOD, APPARATUS, TERMINAL, AND STORAGE MEDIUM" filed on Oct. 18, 2017, which is incorporated by reference in its entirety.

FIELD OF THE TECHNOLOGY

The present disclosure relates to image technologies, and in particular, to an image processing method, an apparatus, a terminal, and a storage medium.

BACKGROUND OF THE DISCLOSURE

With popularization of terminals such as smartphones, selfie taking has become an increasingly common requirement. As infrastructures of the Internet are upgraded and bandwidths are increased, sharing videos and images through social platforms is a currently common use scenario.

Image fusion is fusing an object in an image frame of a video or an object in a photo with an object in a material, to make the object in the image frame of the video or the object in the picture have a feature of the object in the material. In an example in which an object is a face, a face in each image frame of a video is fused with a face in a material image, so that the face in the image frame of the video has features of five sense organs of the face in the material image.

Currently, in a case that a formed image of an object in an image frame or in a photo is fused with a formed image of an image in a material, there is a problem that fusion precision cannot satisfy use requirements.

SUMMARY

In view of the above, in embodiments of the present application, it is expected to provide an image processing method, an apparatus, a terminal, and a storage medium, so that accurate fusion of objects in a fused image is implemented.

To achieve the foregoing objective, the technical solutions of the embodiments of the present application are implemented as follows:

According to a first aspect, an embodiment of the present application provides an image processing method performed at a mobile terminal having one or more processors and memory storing programs to be executed by the one or more processors, the method comprising:

recognizing a source object in a source image, and determining, according to feature points of the source object, an orientation and a size of a formed image of the source object in the source image;

adjusting the orientation and the size of the formed image of the source object in the source image according to matching relationships between the orientation and the size of the formed image of the source object in the source image and an orientation and a size of a formed image of a target object in a target image;

adjusting a shape of the formed image of the source object in the source image and a shape of the formed image of the target object in the target image according to an average shape of the formed image of the source object and an average shape of the formed image of the target object; and fusing, in real time, the source image and the target image in a manner of aligning the shape of the formed image of the source object with the shape of the formed image of the target object.

According to a second aspect, an embodiment of the present application provides a mobile terminal comprising one or more processors, memory coupled to the one or more processors and a plurality of programs stored in the memory that, when executed by the one or more processors, cause the mobile terminal to perform the aforementioned image processing method.

According to a third aspect, an embodiment of the present application provides a non-transitory computer readable storage medium storing a plurality of machine readable instructions in connection with a computing device having one or more processors. The plurality of machine readable instructions, when executed by the one or more processors, cause the computing device to perform the aforementioned image processing method.

Application of the foregoing embodiments of the present application has the following beneficial effects:

On the one hand, before an object in a user image and an object in a material image are fused, an orientation, a size, and a shape of a formed image of a user object in an image are adjusted, to enable features point of the object in the user image to fit feature points of the object in the material image as much as possible, so that a difference between a formed image of the object in the user image and a formed image of the object in the material image is effectively reduced, it is ensured that precision of image fusion can meet use requirements, an effect of real-time fusion is achieved, and operation efficiency is improved.

On the other hand, according to an orientation of a formed image of a user object in an image, the user object is rotated, and during process of performing image fusion, consistency between an angle of an object in a user image and an angle of an object in a material image can be ensured, so that a good fusion effect can also be obtained in a case that the user object is not in a frontal orientation, and accuracy of image fusion can be improved.

DESCRIPTION OF EMBODIMENTS

The following further describes the present disclosure in detail with reference to the accompanying drawings and embodiments. It is to be understood that the embodiments provided herein are merely used to explain the present disclosure but are not intended to limit the present disclosure. In addition, the embodiments provided below are some embodiments, rather than all embodiments, for carrying out the present disclosure. The technical solutions recorded in the embodiments of the present application may be randomly combined with each other provided that there is no conflict.

Before the embodiments of the present application are further described in detail, names and terms involved in the embodiments of the present application are described, and the names and terms involved in the embodiments of the present application apply to the following explanations.

(1) Source image and target image: images that need to be fused with regard to included objects, where an image including a to-be-processed object (that is, a source object) is a source image, and an image including a material object (that is, a target object) used for fusion is a target image.

In an example in which an object is a face (certainly, the object may be any element that can be imaged in an image, for example, an article, a human body, and a particular part of a human body), a face in the target image is used as a material and is fused with a face in the source image, so that the face in the source image has features of five sense organs of the face in the target image. It may be understood that the source image and the target image are relative concepts, and an image used as a source image in a fusion operation may be used as a target image in another fusion operation.

(2) Fusion: Features that an object in a source image has during imaging are combined with features that an object (which may be an object the same as or of a same type as the object in the source image or may be an object of a type different from the object in the source image) in a target image has during imaging, so as to fuse the features of the object in the source image with the features of the object in the target image.

(3) Feature point: a point that can reflect a local feature (such as a color feature, a shape feature, and a texture feature) of an object in an image and that is usually a set of a plurality of pixels, where using a face image as an example, the feature point may be an eye feature point, a mouth feature point, or a nose feature point.

Figure 1A:
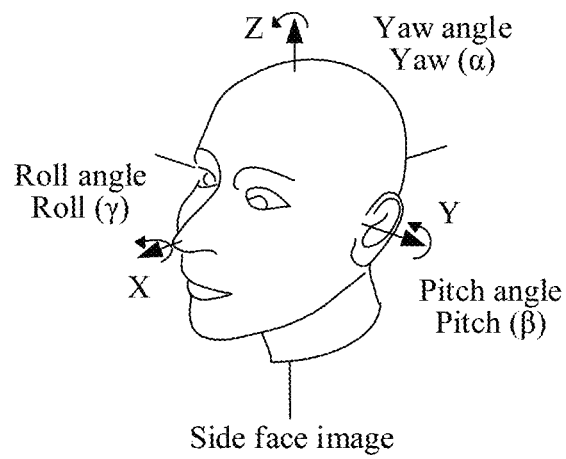
FIG. 1A is a schematic diagram of three formed angles of a face relative to a frontal face in a case that the face is imaged into a side face image in an image according to an embodiment of the present application.

(4) Attitude: an angle in a three-dimensional space formed by an object in an image during imaging. In an example in which the object is a face, referring FIG. 1A, FIG. 1A is a schematic diagram of three formed angles of a face relative to a frontal face in a case that the face is imaged into a side face image in an image according to an embodiment of the present application. The three angles are recorded as a pitch angle, a yaw angle, and a roll angle respectively representing angles of vertical rotation, horizontal rotation, and in-plane rotation, namely, Euler rotation angles (Euler angles for short below). The Euler angles are represented in the following manner:

(4.1) Use a specific feature point (for example, a nasal tip feature point) as an origin, and establish a rigid body coordinate system according to a specific orientation of a face (the rigid body coordinate system changes according to a specific orientation of an object). For example, in FIG. 1A, a direction from the nasal tip to the front is an X-axis positive direction, a direction from the nasal tip to the top of the head is a Z-axis positive direction, and a direction from the nasal tip to the left ear is a Y-axis positive direction.

Figure 1B:
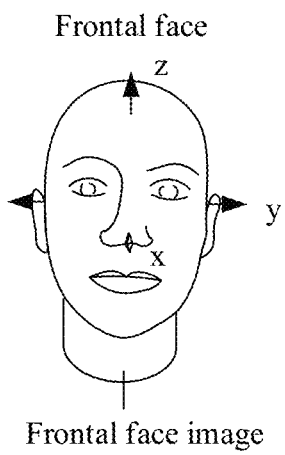
FIG. 1B is a schematic diagram of a reference coordinate system established according to a frontal face orientation according to an embodiment of the present application

(4.2) Establish a fixed reference coordinate system. For example, referring to FIG. 1B, FIG. 1B is a schematic diagram of a reference coordinate system established according to a frontal face orientation according to an embodiment of the present application. In FIG. 1B, a direction from the nasal tip to the front is still a x-axis positive direction, a direction from the nasal tip to the left ear is still an y-axis positive direction, and a direction from the nasal tip to the top of the head is still a z-axis positive direction. It is to be pointed out that in FIG. 1B, even though the orientation of the face changes, the directions of the reference coordinate system do not change.

(4.3) Represent Euler angles as angles (namely, Euler rotation angles, Euler angles for short in the present disclosure) by which a rigid body coordinate system needs rotate (rotate according to an x, y, or z axis) in response to coincidence between the rigid body coordinate system and the reference coordinate system.

(5) Size: a metric of distribution of an object in an imaging region in an image. Using a face as an example, the size includes and may be represented as a width and a height of the face in a two-dimensional plane.

(6) Average shape: an average of a shape of a formed image of an object (namely, a source object) that needs to be subject to fusion processing and a shape of a formed image of an object (that is, a target object) that is in a target image and that is used as a material for fusion processing. An average value of positions of feature points of a same type between the source image and the target image is represented by using an average position.

In an example in which an object is a face, an average value between a position of a nasal tip feature point in a source image and a position of a nasal tip feature point in a target image is obtained to obtain an average position of a nasal tip feature point in an average shape. For other feature points, by analogy, obtained average positions of feature points of different types are used to represent the average shape.

Herein, an image processing apparatus of the embodiments of the present application is implemented with reference to descriptions of accompanying drawings. The image processing apparatus may be implemented in various forms, for example, different types of computer devices such as a server or a terminal (for example, a desktop computer, a notebook computer, or a smartphone). A hardware structure of the image processing apparatus of the embodiments of the present application is further described below. It may be understood that FIG. 2 merely shows an exemplary structure, rather than all structures, of the image processing apparatus, and a partial or entire structure shown in FIG. 2 may be implemented according to requirements.

Figure 2:
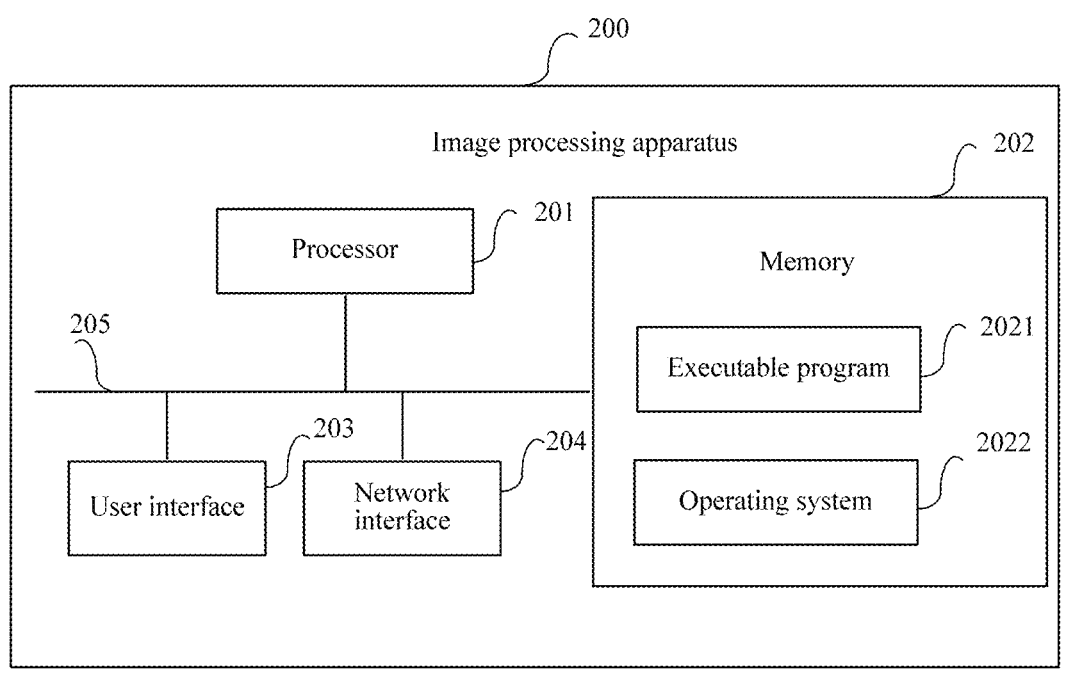
FIG. 2 is a schematic diagram of an optional hardware structure of an image processing apparatus according to an embodiment of the present application.

Referring to FIG. 2, FIG. 2 is a schematic diagram of an optional hardware structure of an image processing apparatus according to an embodiment of the present application, and in an actual application, may be applied to the foregoing server or various terminals running an application program. An image processing apparatus 200 shown in FIG. 2 includes: at least one processor 201, a memory 202, a user interface 203, and at least one network interface 204. Components in the image processing apparatus 200 are coupled together by means of a bus system 205. It may be understood that the bus 205 is configured to implement connection and communication between the components. The bus system 205, besides including a data bus, may further include a power bus, a control bus, and a status signal bus. However, for a purpose of a clear explanation, all buses are marked as the bus system 205 in FIG. 2.

The user interface 203 may include a display, a keyboard, a mouse, a trackball, a click wheel, a key, a button, a touchpad, a touchscreen, or the like.

It may be understood that the memory 202 may be a volatile memory or a non-volatile memory, or may include both a volatile memory and a non-volatile memory.

The memory 202 in the embodiments of the present application is configured to store different types of data to support operations of the image processing apparatus 200. Examples of the data include: any computer program, such as an executable program 2021 and an operating system 2022, used to perform operations on the image processing apparatus 200, and a program used to perform the image processing method of the embodiments of the present application may be included in the executable program 2021.

The image processing method disclosed in the embodiments of the present application may be applied to the processor 201, or may be performed by the processor 201. The processor 201 may be an integrated circuit chip and has a signal processing capability. In an implementation process, each step of the image processing method may be completed by using an integrated logic circuit of hardware in the processor 201 or an instruction in a software form. The foregoing processor 201 may be a general-purpose processor, a digital signal processor (DSP), another programmable logic device, a discrete gate, a transistor logic device, a discrete hardware component, or the like. The processor 201 may implement or execute methods, steps, and logical block diagrams provided in the embodiments of the present application. The general purpose processor may be a microprocessor, any conventional processor, or the like. The steps in the method provided in the embodiments of the present application may be directly performed by a hardware decoding processor, or may be performed by combining hardware and software modules in a decoding processor. The software module may be located in a storage medium. The storage medium is located in the memory 202. The processor 201 reads information in the memory 202 and performs steps of the image processing method provided in the embodiments of the present application by combining the information with hardware thereof.

Figure 3:
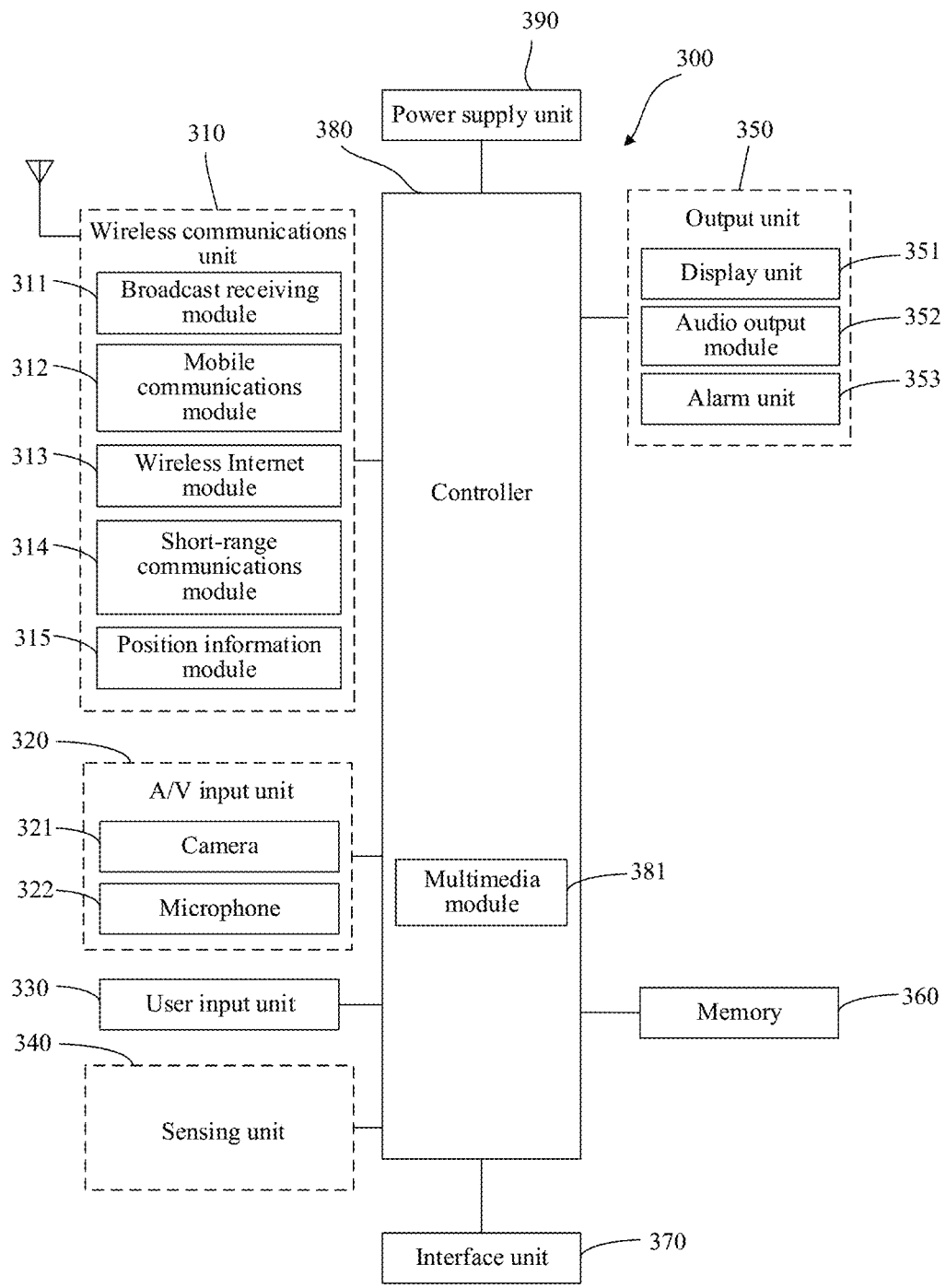
FIG. 3 is a schematic diagram of an optional hardware structure of a terminal according to an embodiment of the present application.

FIG. 3 is a schematic diagram of an optional hardware structure of a terminal 300 according to an embodiment of the present application. As shown in FIG. 3, the terminal 300 may include a wireless communications unit 310, an audio/video (A/V) input unit 320, a user input unit 330, a sensing unit 340, an output unit 350, a memory 360, an interface unit 370, a controller 380, a power supply unit 390, and the like. FIG. 3 shows the terminal 300 having various components. However, it is to be understood that not all shown components need to be implemented and alternatively, more or fewer components may be implemented. The components of the terminal 300 are briefly described below.

The wireless communications unit 310 usually includes one or more components and allows wireless communication between the terminal 300 and a wireless communications system or network. For example, the wireless communications unit 310 may include at least one of a broadcast receiving module 311, a mobile communications module 312, a wireless Internet module 313, a short-range communications module 314, and a position information module 315.

The A/V input unit 320 is configured to receive an audio or video signal. The A/V input unit 320 may include a camera 321 and a microphone 322.

The user input unit 330 may generate input data according to a command input by a user to control various operations of the terminal 300. The user input unit 330 allows the user to input different types of information, and may include a keyboard, a touchpad (for example, a touch sensitive component that detects a change of resistance, pressure, capacitance, or the like caused by a touch on the touch sensitive component), a scroll wheel, a joystick, and the like. Particularly, in a case that the touchpad is superimposed on the display unit 351 as a layer, a touchscreen may be formed.

The sensing unit 340 detects a current state of the terminal 300 (for example, an on or off state of the terminal 300), a position of the terminal 300, whether a user touches the terminal 300 (that is, touch input), an orientation of the terminal 300, an accelerated or decelerated movement and a direction of the terminal 300, and the like, and generates a command or signal used to control an operation on the terminal 300.

The interface unit 370 is configured as an interface through which at least one external apparatus can be connected to the terminal 300.

The interface unit 370 may be configured to receive input (for example, data information or power) from the external apparatus, and transmit the received input to one or more elements in the terminal 300, or may be configured to transmit data between the terminal 300 and the external apparatus.

The output unit 350 is constructed to provide an output signal visually, as audio, and/or in a tactile manner (for example, an audio signal, a video signal, an alarm signal, or a vibration signal). The output unit 350 may include a display unit 351, an audio output module 352, an alarm unit 353, and the like.

The memory 360 may store a software program of processing and control operations and the like performed by the controller 380 or temporarily store data that has been output or that is to be output (for example, a phone book, a message, a still image, and a video). In addition, the memory 360 may store data of vibration and audio signals that are output in various manners in a case that a touch is applied to the touchscreen.

The memory 360 may include a storage medium of at least one type. The storage medium includes a flash memory, a hard disk, a multimedia card, a card-type memory (for example, an SD or DX memory), a magnetic memory, a magnetic disk, or an optical disk. In addition, the terminal 300 may cooperate with a network storage apparatus that implements a storage function of the memory 360 through a network connection. There may be one or more memories 360, storing one or more programs. The program may include one or more units each corresponding to a set of instructions. The one or more processors are configured to execute executable instructions of the image processing method provided in the embodiments of the present application.

The controller 380 usually controls an overall operation of the terminal 300. For example, the controller 380 performs control and processing related to a voice call, data communication, and a video call, and the like. In addition, the controller 380 may include a multimedia module 381 configured to reproduce or play back multimedia data. The multimedia module 381 may be constructed inside the controller 380, or may be constructed to be separated from the controller 380. The controller 380 may perform pattern recognition processing to recognize handwriting input or picture drawing input performed on a touchscreen as a character or an image.

The power supply unit 390 receives external power or internal power under the control of the controller 380 and provides appropriate power required for operating various elements and components.

At this point, the image processing apparatus and the terminal involved in the embodiments of the present application have been described according to functions. Based on the schematic diagrams of the optional hardware structures of the image processing apparatus and the terminal, application scenarios for performing the image processing method of the embodiments of the present application are described below.

Figure 4A:
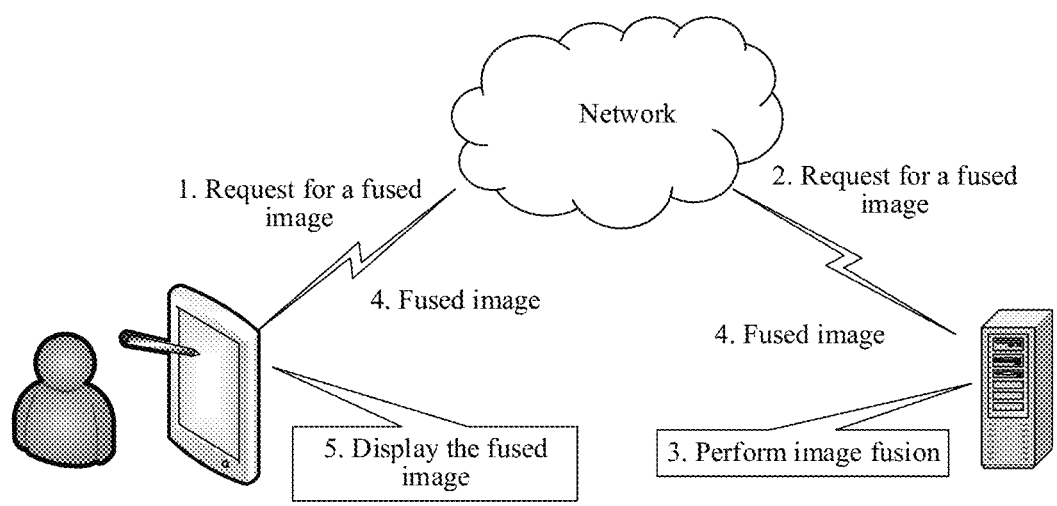
FIG. 4A is a schematic diagram of an optional application scenario of an image processing method according to an embodiment of the present application.

In an optional application scenario of the image processing method provided in the embodiments of the present application, a client requests, according to requirements, a server for processing of image fusion. Referring to FIG. 4A, FIG. 4A is a schematic diagram of an optional application scenario of an image processing method according to an embodiment of the present application. The client captures a source image, such as a photo or a video, of a specific object (a source object may be, for example, a face, and certainly, the source object may alternatively be an object in another form such as an animal head), requests the server for processing of image fusion, and performs display according to a fused image returned by the server. Herein, in a case that a specific object, such as a photo or a video, in a captured source image has relatively large resolution, a request for image fusion may be submitted to the server.

In an example, the client may transmit a source image to the server according to requirements. In addition, a target image used as a fusion material may be preset by a user on the server, may alternatively be decided by the server according to preference of the user or a use record of a fused image, and certainly, may alternatively be randomly selected by the server. Alternatively, the client may send a source image and a target image simultaneously to the server. In this case, the target image may be an image selected in a material theme (such as a movie theme and an animation theme) provided by the user on the client, or may be a photo or a video shot by the user to obtain a result of image fusion from the server.

In a case that the client simultaneously transmits the source image and the target image to the server, a processing procedure of image fusion is: first, simultaneously transmitting and saving, by the client, the source image and the target image to the server; subsequently, in a case that image fusion needs to be performed, requesting, by the client, the server for a fused image and sending an image obtaining request; then, parsing, by the server, the image obtaining request, and transmitting the to-be-processed source image and the to-be-processed target image to the client; and finally, performing, by the client, fusion processing on objects in the received source image and target image, and transmitting a fused image to the server in real time.

For example, in instant messaging such as a QQ scenario, in a process in which a user A and a user B perform video chatting, to fuse a source image in the user A with a target image in the user B, in this case, the foregoing processing procedure of image fusion may be used.

Figure 4B:
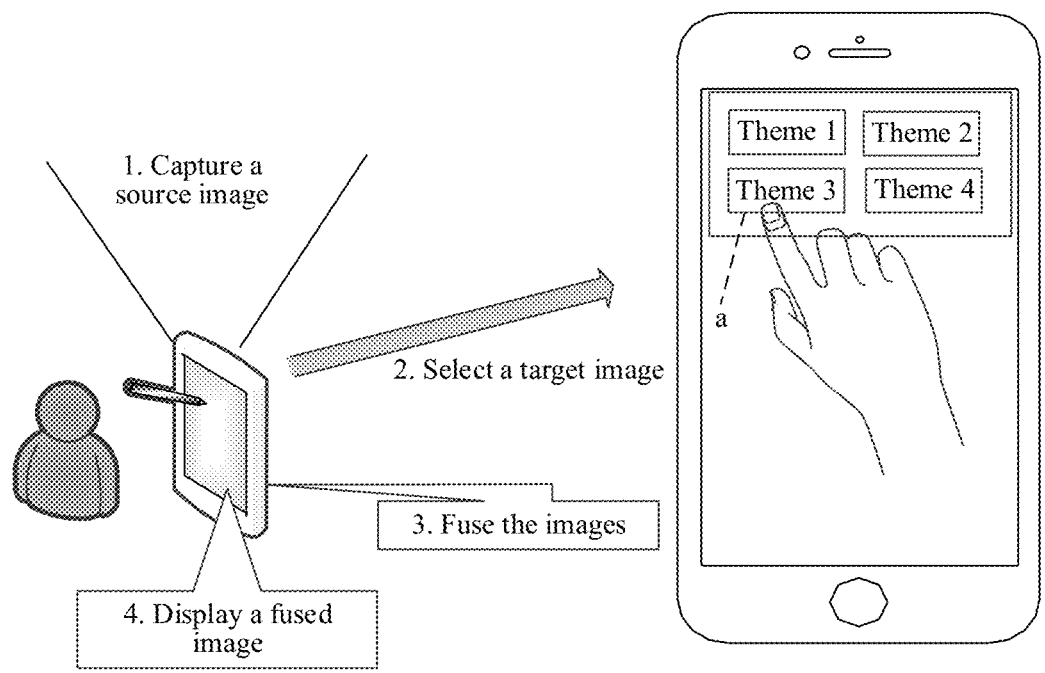
FIG. 4B is a schematic diagram of an optional application scenario of an image processing method according to an embodiment of the present application.

In another optional application scenario of the image processing method provided in the embodiments of the present application, referring to FIG. 4B, FIG. 4B is a schematic diagram of another optional application scenario of an image processing method according to an embodiment of the present application. The client performs fusion processing according to a source image of a specific object that is shot in a photo or video form and a target image provided by the user or a target image selected from candidate target images provided by the client. For example, the client provides different themes such as a theme 1 to a theme 4, an image of a corresponding theme, such as the theme 3, is selected through an operation a, and then, the selected image of the theme 3 is used as the target image, and is fused with the source image. Herein, in a case that a requirement on resolution of a photo or video of a specific object shot by the client is not high, the client may be used to perform local fusion.

An overall implementation process of image fusion processing in the foregoing embodiment of the present application is further described below in detail by using a specific embodiment.

Figure 5:
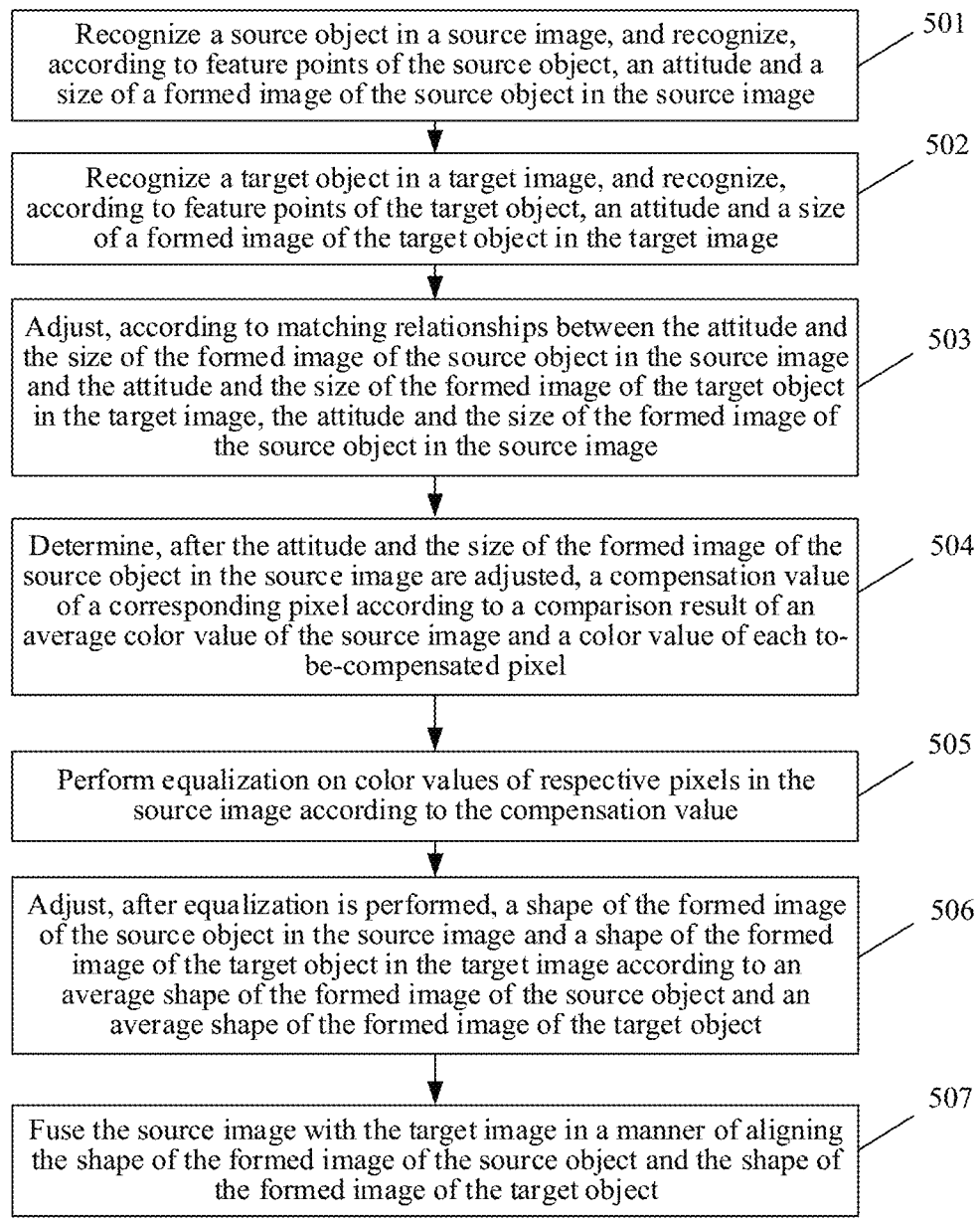
FIG. 5 is an optional schematic diagram of an image processing method according to an embodiment of the present application.

Referring to FIG. 5, FIG. 5 is an optional schematic diagram of an image processing method according to an embodiment of the present application. The image processing method may be applied to a server or a terminal. This is not limited herein. In this embodiment of the present application, the server may include, but is not limited to, a cloud server, and the terminal may include, but is not limited to, an electronic device such as a smartphone, a tablet computer, and a handheld computer. As shown in FIG. 5, in this embodiment of the present application, an implementation process of the image processing method includes the following steps.

Step 501: Recognize a source object in a source image, and determine, according to feature points of the source object, an orientation and a size of a formed image of the source object in the source image.

In an optional embodiment of the present application, the source object recognized in the source image is a source object matching a predetermined feature. For a source object that does not match the predetermined feature, no processing is performed herein in this embodiment of the present application. The source object in the source image may be recognized in the following manner: extracting a feature in at least one dimension from the source image, and matching the extracted feature with an object feature template; and determining that a source object matching the feature template exists in the source image in a case that a similarity exceeds an object feature similarity threshold.

The method for recognizing the source object in the source image in this embodiment of the present application is further described below in detail by using an example in which the source object is a face (certainly, the method for recognizing the source object in the source image in this embodiment of the present application is also applicable to a case in which the source object is an object of another type).

Figure 6:
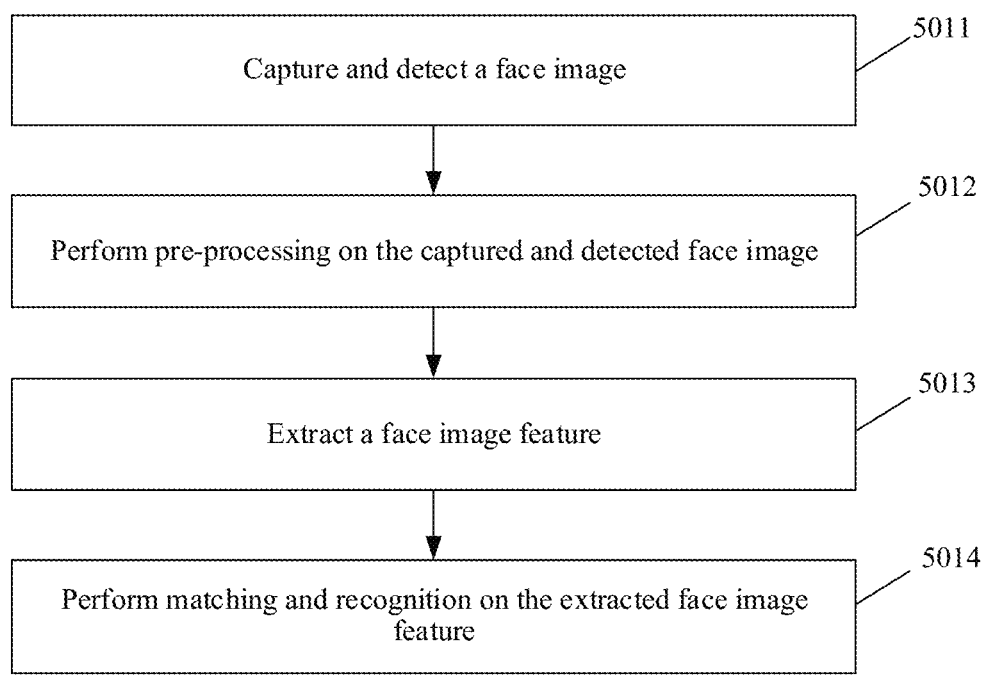
FIG. 6 is an optional schematic diagram of a method for recognizing a source object in a source image according to an embodiment of the present application.

Referring to FIG. 6, FIG. 6 is an optional schematic diagram of a method for recognizing a source object in a source image according to an embodiment of the present application, including the following steps.

Step 5011: Capture and detect a face image.

For face image capturing, different face images can be captured by a camera of a terminal device such as a mobile phone. For example, a still image, a moving image, and aspects such as different positions or different expressions, all can be captured. In a case that a user is in a shooting range of a capturing device, the capturing device automatically searches for and captures a face image of the user.

For face image detection, in an actual practical application, face image detection is mainly configured for pre-processing input of subsequent facial recognition, that is, accurately calibrating a position and a size of a face (that is, a formed image of the face) in an image. A face in an image includes abundant pattern features such as a histogram feature, a color feature, a template feature, and a structural feature. Face image detection is extracting useful features in an image and calibrating a face by using the features.

At present, a mainstream method of face image detection is calibrating a face based on the foregoing features by using a machine learning algorithm of AdaBoost. The AdaBoost algorithm is an iterative algorithm used for classification. In a process of implementing face image detection, the AdaBoost algorithm is used to first select some rectangular features that best represent a face (implemented by using a weak classifier), then construct the weak classifier into a strong class in a weighted voting manner, and further, connect in series several strong classifiers obtained by training to form a cascade classifier of a cascade structure, so as to effectively improve a speed of detecting a face by a classifier.

Step 5012: Perform pre-processing on the captured and detected face image.

In an optional embodiment of the present application, a pre-processing operation on an image of a face is performed based on a facial detection result (that is, a position and a size of the face in the obtained image), and the face image is processed and finally serves a subsequent face image feature extraction step. Because the image is limited by various conditions and is randomly interfered with, the image usually cannot be directly used, and image pre-processing, such as gray level correction and noise filtration, needs to be performed on the image in an early stage of image processing. Herein, for the face image, the pre-processing procedure mainly includes operations such as light compensation, gray level transformation, histogram equalization, normalization, geometric correction, filtration, and sharpening of the face image.

Step 5013: Extract a face image feature.

For example, extractable face image features are generally classified into visual features, pixel statistical features, face image transform coefficient features, face image algebraic features, and the like. Methods for extracting face image features may be summarized into two categories: one is a knowledge-based representation method, and the other is a representation method based on algebraic features or statistical learning.

The knowledge-based representation method is mainly obtaining feature data that contributes to face classification according to shape descriptions of facial organs and distance properties between the respective facial organs, where feature components of the feature data usually include a Euclidean distance between feature points, a curvature, an angle, and the like. A face includes local features such as the eyes, the nose, the mouth, and the chin, geometric descriptions on the local features and structural relationships between the local features may be used as important features for recognizing the, and the features are referred to as geometric features.

Step 5014: Perform matching and recognition on the extracted face image feature.

For example, a similarity threshold for the face image feature is preset, then searching and matching are performed on feature data of the extracted face image and a facial feature template pre-stored in a database (the facial feature template includes a series of feature points), in a case that a similarity of matching exceeds a preset face image feature similarity threshold, it may be determined that there is a face image feature corresponding to the facial feature template in the source image, and an obtained result of the matching is output.

In an optional embodiment of the present application, the source image may be one of image frames of a video or may be a picture or a photo. This is not limited herein.

In an optional embodiment of the present application, an orientation of a formed image of the source object in the source image may be determined according to feature points of the source object in the following manner: matching the feature points of the source object with feature points of different orientation template; and determining that the source object has an orientation included in a corresponding orientation template in a case that a similarity of matching exceeds a shape similarity threshold.

Figure 7:
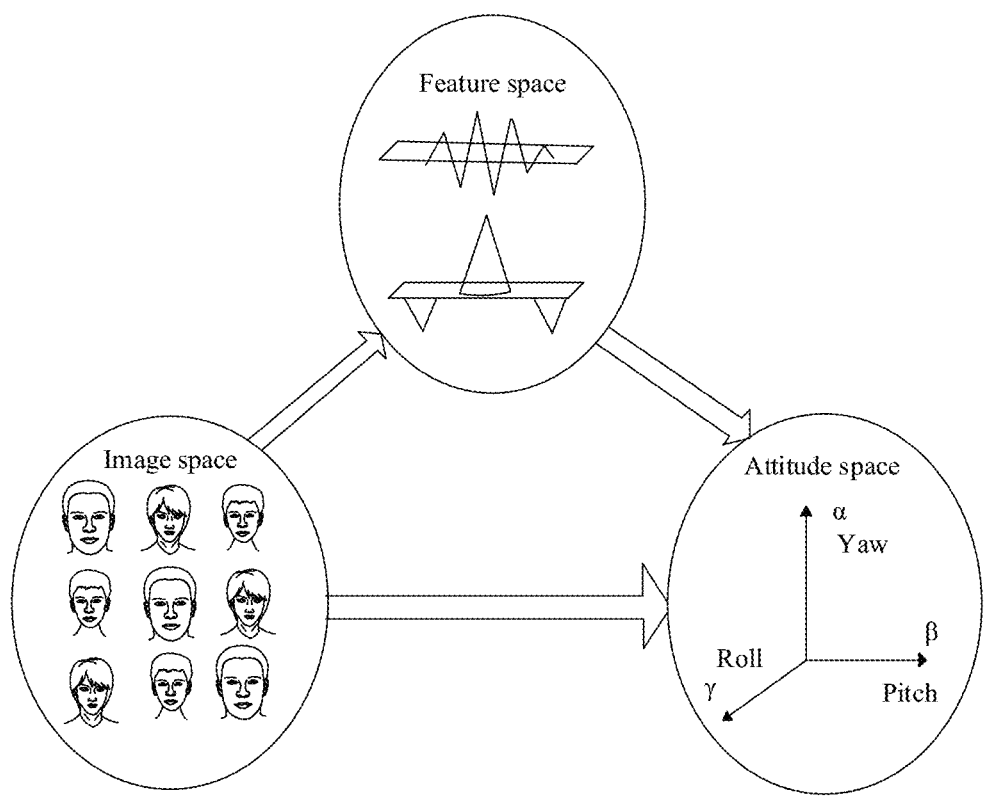
FIG. 7 is an optional schematic diagram of a processing procedure for recognizing an orientation of a face in an image according to an embodiment of the present application.

Herein, the orientation of the formed image of the object in the image may be represented by vector-Eulerian angles including three types of angle parameters. In an example in which the object is a face, referring to FIG. 7, FIG. 7 is an optional schematic diagram of a processing procedure for recognizing an orientation of a face in an image according to an embodiment of the present application. In FIG. 7, for recognition of an orientation of a face, image-based recognition of an orientation of a face is achieved through mapping from an image space to a feature space and then from the feature space to a three-dimensional orientation space.

It needs to be particularly emphasized that although a face orientation is a most direct and natural expression of an orientation of a face, a main reason why Euler angles are selected to recognize the orientation of the face in this embodiment of the present application is that the face orientation is not a complete expression of the orientation of the face and cannot uniquely express all statuses of the orientation of the face, but the Euler angles can accurately express the orientation of the face in all statuses and are a set of three-dimensional angular parameters used to describe orientations of a rigid body in a three-dimensional space.

The Euler angles usually relate to two coordinate systems: a reference coordinate system and a rigid body coordinate system. The reference coordinate system may be any coordinate system in a three-dimensional space, the reference coordinate system itself is stationary, does not change its position with rotation of a rigid body. However, the rigid body coordinate system is fixed on the rigid body and automatically rotates with rotation of the rigid body.

In an example in which an object is still a face, certainly, applicability to recognition of orientations of objects of other types is not excluded, and a feature space including feature points of a face may include the following: a geometric relationship of key points of the face, a shape template, a constrained local model of the face, and the like.

Recognition of the orientation of the face can be implemented by using a method such as recognition based on a geometric key relationship of key feature points of a face, recognition based on a shape template, recognition based on a machine learning model, and the like. The recognition based on a geometric key relationship of key feature points of a face and recognition based on a shape template are separately and briefly described below.

1) For the recognition based on a geometric key relationship of key feature points of a face, geometric relationship templates of key feature points are recorded for different orientations of different faces, geometric relationships of the respective key feature points of the face are described in the geometric relationship templates, and a geometric relationship of recognized key feature points in the image are matched with the geometric relationship templates, where an orientation included in a geometric relationship template having a highest matching degree is a recognition result of the orientation of the face in the image.

2) For the recognition based on a shape template, spaces of different orientations of the face are quantized into discrete pixels, the pixels that are quantized for each orientation constitute an image template, and a captured face image is matched with image templates of different orientations, where an orientation included in an image template having a highest matching degree is a recognition result of the orientation of the face in the image.

It is to be noted that in a recognition process of an orientation of a face, the foregoing recognition manners may be used alternatively or in combination. This is not limited herein.

Herein, for the size of the formed image of the source object in the source image, after the feature points of the source object are recognized, sizes of the source object in different dimensions (that is, in different directions), such as a distance from the eyebrows to the chin and a distance from the left ear to the right ear, can be obtained by calculating distances between feature points of edge parts.

Figure 8:
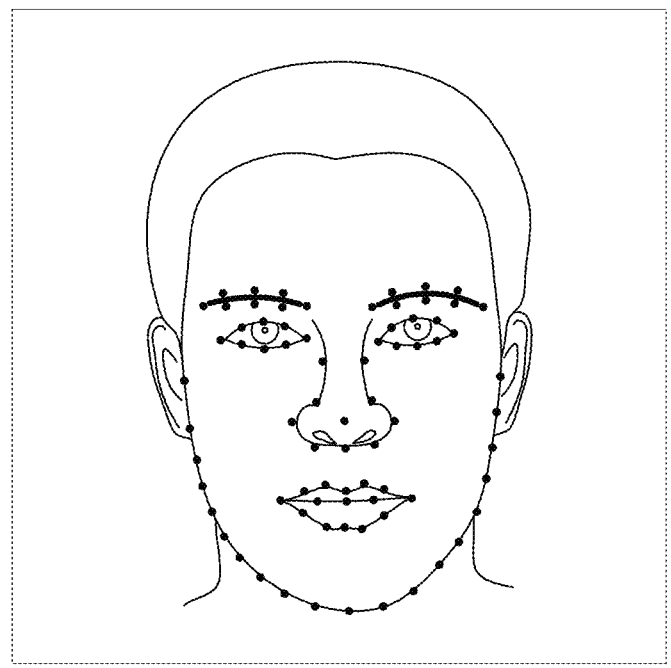
FIG. 8 is a schematic diagram of reference points for positioning five sense organs according to an embodiment of the present application.

It is to be noted that upon performance comparison on all open software development kits (SDKs) related to object detection and object orientation recognition, to ensure accuracy of detection, a facial recognition SDK is selected in this embodiment of the present application. In an example in which an object is a face, a schematic diagram of reference points for positioning five sense organs according to an embodiment of the present application as shown in FIG. 8 may be obtained by using the SDK. Referring to FIG. 8, 83 features points on a face may be obtained in FIG. 8. The feature points are classified into eyebrow feature points, eye feature points, nose feature points, mouth feature points, and facial contour feature points.

Step 502: Recognize a target object in a target image, and determine, according to feature points of the target object, an orientation and a size of a formed image of the target object in the target image.

In an optional embodiment of the present application, the target image may be one of image frames of a video or may be a picture or a photo. This is not limited herein.

In an optional embodiment of the present application, alternatively, before a source object is recognized, a target object may be first recognized in a target image, and then, an orientation and a size of a formed image of the target object in the target image are determined according to feature points of the target object. That is, no limitation is imposed on a sequence of step 501 and step 502 in this embodiment of the present application.

It is to be noted that a method for recognizing an object and a method for recognizing an orientation and a size of an object that are similar to those in the foregoing step 501 (see the method shown in FIG. 6) may be used to recognize a target object in a target image, and determine, according to feature points of the target object, an orientation and a size of a formed image of the target object in the target image. Details are not described herein again. In an optional embodiment of the present application, the target object recognized in the target image is a target object matching a predetermined feature. For a target object that does not match the predetermined feature, no processing is performed herein in this embodiment of the present application.

Step 503: Adjust, according to matching relationships between the orientation and the size of the formed image of the source object in the source image and the orientation and the size of the formed image of the target object in the target image, the orientation and the size of the formed image of the source object in the source image.

In an optional embodiment of the present application, the foregoing step 503 may be performed in the following manner: performing a rotation operation on the formed image of the source object in the source image according to Euler angles of the formed image of the source object in the source image until the Euler angles of the formed image of the source object in the source image are consistent with Euler angles of the formed image of the target object in the target image; and performing a scale-up or scale-down operation on the formed image of the source object in the source image according to the size of the formed image of the source object in the source image until the size is consistent with the size of the formed image of the target object in the target image.

Herein, a presented image of a target object in a camera is greatly affected by an orientation, and information, such as a color, a shape, and a texture, of images presented by a same object in different orientations is different. In an example in which both the source object and the target object are faces, orientations of the faces have two expression manners: a face orientation and Euler angles. In this embodiment of the present application, the orientation of the face is represented by three formed angles of a face relative to a frontal face in a case that the face is imaged into a side face image in an image, and referring to FIG. 1A, the three angles are recorded as a pitch angle, a yaw angle, and a roll angle respectively representing orientation angles in three directions in which the face performs vertical rotation, horizontal rotation, and in-plane rotation.

For example, to ensure consistency between angles of faces in the source image and the target image, an angle of a formed image of the face (relative to a reference coordinate system) in the source image usually needs to be captured, then, a difference between the angle of the face in the source image and an angle of the face in the target image is obtained, and subsequently, the face in the source image is rotated by using the calculated difference until the angle of the face in the source image is consistent with the angle of the face in the target image. Meanwhile, because there is a difference between a size of the formed image of the face in the source image and a size of the formed image of the face in the target image, and an effect of fusion may be affected, in this embodiment of the present application, a scale-down or scale-up operation is performed on the formed image of the face in the source image according to the size of the formed image of the face in the target image until the size of the formed image of the face in the source image is consistent with the size of the formed image of the face in the target image.

Similarly, the source image and the target image each may be one of image frames of a video or may be a picture or a photo. This is not limited herein.

Step 504: Determine, after the orientation and the size of the formed image of the source object in the source image are adjusted, a compensation value of a corresponding pixel according to a comparison result of an average color value of the source image and a color value of each to-be-compensated pixel.

In an optional embodiment of the present application, the foregoing step 504 may be performed in the following manner: determining that a compensation value of the to-be-compensated pixel is a product of a reference value and a first compensation coefficient in a case that the color value of the to-be-compensated pixel is greater than the average color value of the source image; and determining that a compensation value of the to-be-compensated pixel is a product of a reference value and a second compensation coefficient in a case that the color value of the to-be-compensated pixel is less than or equal to the average color value of the source image.

The first compensation coefficient and the second compensation coefficient are determined according to a ratio of an original color value to an average color value of the source image. The reference value is determined according to a difference between the average color value of the source image and the average color value of the target image.

Step 505: Perform equalization on color values of respective pixels in the source image according to the compensation value.

In an actual application, in a process of fusing the object in the source image and the object in the target image, to make colors of the two approach each other to a maximum extent to ensure an effect of fusion, in this case, equalization needs to be performed on color values of respective pixels in the source image.

With reference to the foregoing step 504 and step 505, using an example in which an object is a face, a process of performing equalization on color values of respective pixels in a source image is described below in detail.

Figure 9:
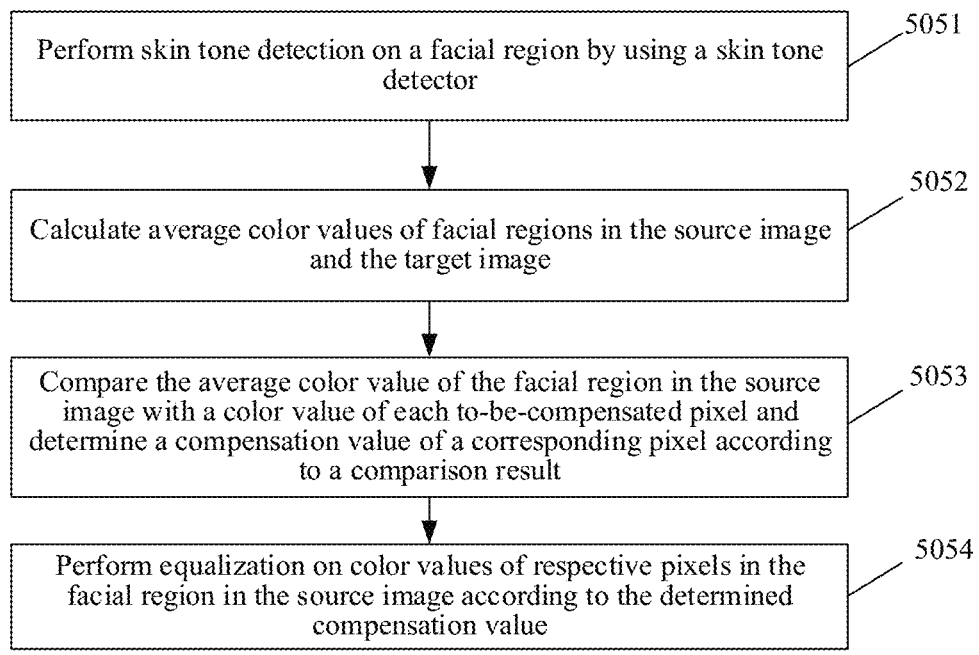
FIG. 9 is an optional schematic diagram of a method for performing equalization on color values of respective pixels in a source image according to an embodiment of the present application.

Referring to FIG. 9, FIG. 9 is an optional schematic diagram of a method for performing equalization on color values of respective pixels in a source image according to an embodiment of the present application, including the following steps.

Step 5051: Perform skin tone detection on a facial region by using a skin tone detector.

Figure 10A:
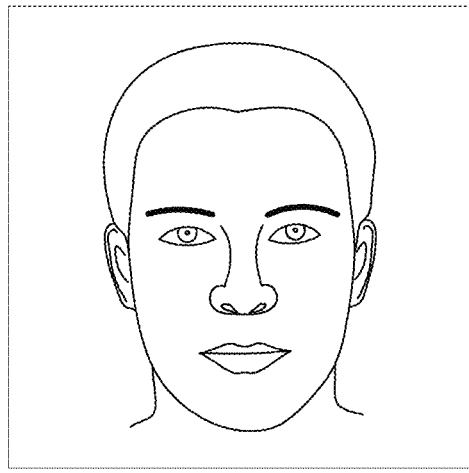
FIG. 10A is a schematic diagram of a facial region located in a background image according to an embodiment of the present application.
Figure 10B:
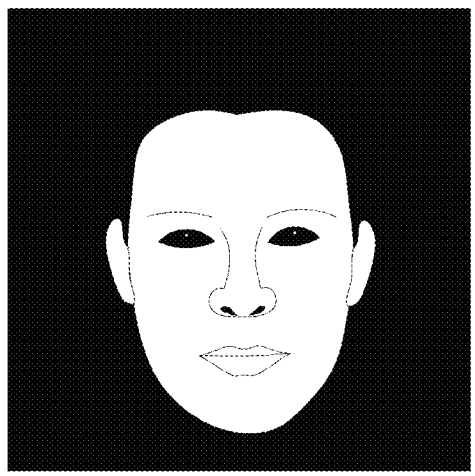
FIG. 10B is a schematic diagram of merely displaying a facial region according to an embodiment of the present application.
Figure 10C:
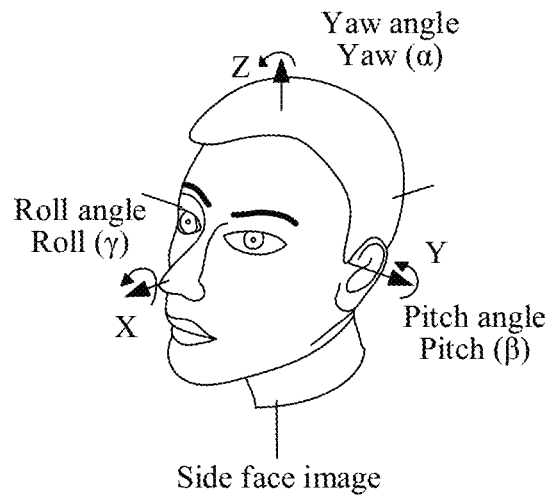
FIG. 10C is a schematic side view of a face located in a background image according to an embodiment of the present application.

In an optional embodiment of the present application, color values in a facial region may be detected with a skin tone detector by using various existing or novel detection methods and priori features in three channels. This is not limited herein. The three channels are respectively R, G, and B channels, and R, G, and B respectively correspond to three colors, namely, red, green, and blue. For example, a region that is detected and that satisfies the following conditions is used as a facial region: R>95 And G>40 And B>20 And R>G And R>B And Max (R, G, B)−Min (R, G, B)>15 And Abs (R−G)>15. Referring to FIG. 10A, FIG. 10A is a schematic diagram of a facial region located in a background image according to an embodiment of the present application. By performing skin tone detection on a facial region located in a background image, a schematic diagram of merely displaying a facial region according to an embodiment of the present application as shown in FIG. 10B may be obtained. In view of FIG. 10B, in the schematic diagram, a facial region is not located in a background image. FIG. 10C is a schematic side view of a face located in a background image according to an embodiment of the present application.

Step 5052: Calculate average color values of facial regions in the source image and the target image.

For example, an average color value of the facial regions in the source image is calculated from the three channels of R, G, and B, and is record as userRGB, and an average color value of the facial region in the target image is calculated in the three channels of R, G, and B, and is recorded as modelRGB. Subsequently, according to the average color value userRGB of the facial region in the source image and the average color value modelRGB of the facial region in the target image, an empirical value can be obtained as a reference value for performing equalization on color values of respective pixel points in the source image. For example, a difference between the average color value userRGB of the facial region in the source image and the average color value modelRGB of the facial region in the target image may be obtained and recorded as: diffRGB=userRGB−modelRGB, and the calculated difference is used as a reference value. Certainly, transformation may be performed in some other manners, for example, diffRGB=(userRGB−modelRGB)*a or diffRGB=userRGB*a−modelRGB, where a is any coefficient less than 1. With regard to which expression manner is used, no limitation is imposed in the present disclosure.

Step 5053: Compare the average color value of the facial region in the source image with a color value of each to-be-compensated pixel and determine a compensation value of a corresponding pixel according to a comparison result.

For example, the color value of the to-be-compensated pixel is recorded as pixel, in a case that the color value of the to-be-compensated pixel is greater than the average color value of the facial region in the source image, that is, pixel is greater than userRGB, the compensation value of the to-be-compensated pixel is determined as a product of a reference value diffRGB and a first compensation coefficient a1.

In a case that the color value of the to-be-compensated pixel is greater than the average color value of the facial region in the source image, that is, pixel is less than or equal to userRGB, the compensation value of the to-be-compensated pixel is determined as a product of the reference value diffRGB and a second compensation coefficient a2.

a1 and a2 are determined according to a ratio of an original color value color to an average color value of the source image.

Step 5054: Perform equalization on color values of respective pixels in the facial region in the source image according to the determined compensation value.

Herein, in a process of performing equalization on color values of respective pixels in the facial region in the source image, the following operations may be performed.

In a case that pixel is greater than userRGB, a result of color equalization is represented as result=color+diffRGB*a1, where a1=((1.0−color)/(1.0−userRGB)).

In a case that pixel is less than or equal to userRGB, a result of color equalization is represented as result=color+diffRGB*a2, where a2=(color/userRGB).

Certainly, the first compensation coefficient a1 and the second compensation coefficient a2 may be adaptively adjusted according to requirements of actual situations. This is not limited to the foregoing expression manners.

Step 506: Adjust, after equalization is performed, a shape of the formed image of the source object in the source image and a shape of the formed image of the target object in the target image according to an average shape of the formed image of the source object and an average shape of the formed image of the target object.

In an optional embodiment of the present application, the foregoing step 506 may be performed in the following manner: calculating an average position of feature points of a same type of the source object in the source image and the target object in the target image; and adjusting a position of the feature point of the source object in the source image and a position of the feature point of the target object in the target image to match the average position.

In an example in which the source object and the target object are both faces, feature points of a same type of the source object in the source image and the target object in the target image may be a nasal tip feature in the source image and a nasal tip feature in the target image and certainly, may be feature points of another type capable of representing a face. This is not limited herein.

It is to be noted that in this embodiment of the present application, average positions of feature points of a same type are used to represent an average region of a face. Herein, whether a position of the feature point of the source object in the source image and a position of the feature point of the target object in the target image match the average position may be determined by using a determining method of position consistency or threshold comparison.

For example, a position of a feature point of the source object in the source image is compared with an average position, a position of a feature point of the target object in the target image is compared with the average position, and in a case that the positions are consistent in both of the comparisons, a matching success can be determined. Alternatively, a Euclidean distance between a position of a feature point of the source object in the source image and an average position may be compared with a preset distance threshold, and in a case that the Euclidean distance is less than the distance threshold, a matching success can be determined. Similarly, with regard to whether a position of a feature point of the target object in the target image matches the average position, whether matching succeeds may also be determined by using a same determining method of threshold comparison.

Herein, the step of adjusting a position of the feature point of the source object in the source image and a position of the feature point of the target object in the target image to both match the average position may be performed in the following three different manners:

Manner 1): Construct a polygon according to positions of the feature points of the source object in the source image and positions of the feature points of the target object in the target image, and adjust the constructed polygon for matching.

For example, the foregoing manner 1) includes: forming an average polygon by connection according to average positions of the respective feature points; forming a polygon by connection according to the feature points of the source object in the source image and forming a polygon by connection according to the feature points of the target object in the target image; and adjusting shapes of the polygons formed by connection to be consistent with a shape of the average polygon.

For convenience of description, in this embodiment of the present application, in an example in which the formed average polygons and polygons are all triangles, and the source object and the target object are both faces, feature points of the faces are used as vertices of the triangles, and the vertices of the triangles are connected to form triangles, so that the face in the source image and the face in the target image can be segmented into a plurality of small triangles.

Similarly, positions of feature points of a same type in the face in the source image and the face in the target image are averaged, to obtain an average value of the positions. For example, an average value between the position of the nasal tip feature point in the source image and the position of the nasal tip feature point in the target image is obtained as an average position of a nasal tip feature point in the average triangle. An average value of a position of a left eye feature point in the source image and a position of a left eye feature point in the target image is obtained to obtain an average position of a left eye feature point in the average triangle. For other feature points, by analogy, obtained average positions of feature points of different types are used to represent the average triangle. Subsequently, whether a shape of the constructed average triangle is consistent with a shape of the triangle formed by connection is determined, and in response to a difference between the shapes of the two, the triangle formed by connection is adjusted to be consistent with the shape of the average triangle.

Figure 11:
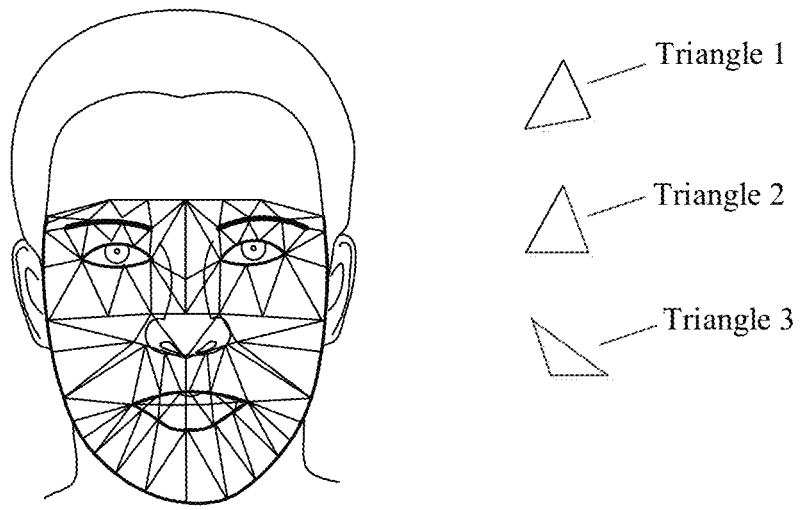
FIG. 11 is a schematic structural diagram of a facial mesh according to an embodiment of the present application.

For example, in an example in which an average position of an average triangle is an average position of nasal tip feature points, one of triangles, such as a triangle 1 in FIG. 11, is selected as an example, and then, to keep both a shape formed by connecting nasal tip feature points in the source image, as shown in a shape of a triangle 2 in FIG. 11, and a shape formed by connecting nasal tip feature points in the target image, as shown in a shape of a triangle 3 in FIG. 11 to be both consistent with a shape of the triangle 1. Corresponding angle adjustment operations may be performed on respective angles of the triangle 2 formed by connecting the nasal tip feature points in the source image and respective angles of the triangle 3 formed by connecting the nasal tip feature points in the target image.

To improve an effect of facial fusion, after equalization is performed on a skin tone of the face in the source image, averaging and deforming operations need to be performed on the face in the source image and the face in the target image, mainly including the following two steps:

(1) Scale-down or scale-up, rotate, and displace the face in the source image.

(2) Perform facial meshing.

The average face technology is averaging feature point coordinates of two different faces. To ensure correctness of feature points of the face in the source image and the face in the target image during calculation of average values, herein, the face in the source image needs to be scaled down or up, rotated, and displaced according to a size, an angle, and a nasal tip position of the face in the target image. A feature point set A3 of the face in the source image used for being averaged with that of the face in the target image can be obtained using the following policies:

(1) It is assumed that feature points of the face in the source image are a set A, feature points of the face in the target image are a set B, a width of the face in the source image is w1, and a width of the face in the target image is w2.

(2) A deflection angle α=an angle of the face in the target image−an angle of the face in the source image, and the set A1 may be obtained by rotating A by α.

(3) A1 is displaced:

an X-axis offset offsetX=a nasal tip point x of the face in the source image−a nasal tip point x of the face in the target image; and a Y-axis offset offsetY=a nasal tip point y of the face in the source image−a nasal tip point y of the face in the target image.

The set A2 may be obtained by offsetting (offsetX, offsetY) the set A1.

(4) A2 is scaled down or up to obtain A3, where a scale is scale=w2/w1.

After A3 is obtained, positions of feature points of a same type in A3 and a set B are averaged to obtain average facial coordinates. After the average facial coordinates are obtained, the face in the source image and the face in the target image are adjusted by using the average face as a reference, to make them both consistent with the shape of the average face. Herein, the face in the source image and the face in the target image may be deformed by using a mesh stretching method. Specifically, a face is segmented into several small triangles according to 83 feature points of the face by using the Delaunay triangulation algorithm. Referring to FIG. 11, FIG. 11 is a schematic structural diagram of a facial mesh according to an embodiment of the present application. An effect averaging with the average face is achieved by changing positions of vertices of the triangle formed by the face in the source image and the face in the target image.

A method for obtaining feature points of an average face in this embodiment of the present application average is further described below in detail.

Figure 12:
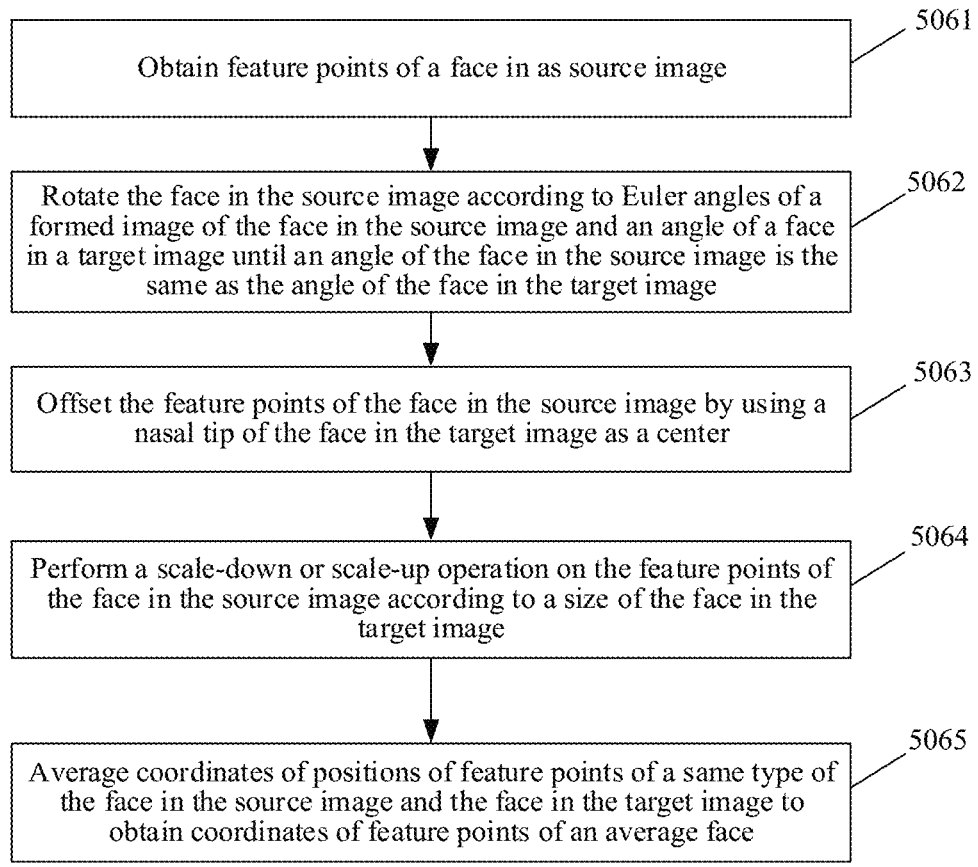
FIG. 12 is an optional schematic diagram of a method for obtaining feature points of an average face according to an embodiment of the present application.

Referring to FIG. 12, FIG. 12 is an optional schematic diagram of a method for obtaining feature points of an average face according to an embodiment of the present application, including the following steps.

Step 5061: Obtain feature points of the face in the source image.

Step 5062: Rotate the face in the source image according to Euler angles of a formed image of the face in the source image and an angle of the face in the target image until an angle of the face in the source image is the same as the angle of the face in the target image.

Step 5063: Offset the feature points of the face in the source image by using a nasal tip of the face in the target image as a center.

Step 5064: Perform a scale-down or scale-up operation on the feature points of the face in the source image according to a size of the face in the target image.

Step 5065: Average coordinates of positions of feature points of a same type of the face in the source image and the face in the target image to obtain coordinates of the feature points of the average face.

Manner 2): Perform affine transformation on a position of the feature point of the source object in the source image and a position of the feature point of the target object in the target image until the positions match the average position.

With regard to the foregoing manner 2), affine transformation is performed on a formed image of the source object in the source image according to a positional relationship between a position of a feature point included in the average shape and a position of a corresponding feature point of the source object in the source image.

Affine transformation is performed on a formed image of the target object in the target image according to a positional relationship between a position of a feature point included in the average shape and a position of a corresponding feature point of the target object in the target image.

In an optional embodiment of the present application, affine transformation may be performed on the formed image of the source object in the source image and the formed image of the target object in the target image by using various existing or novel affine transformation methods. Details are not described herein again.

Manner 3): Perform a feature point-based image distortion operation on a position of the feature point of the source object in the source image and a position of the feature point of the target object in the target image until the positions match the average position.

With regard to the foregoing manner 3), a feature point-based image distortion operation may be performed on a position of the feature point of the source object in the source image and a position of the feature point of the target object in the target image by using various existing or novel image distortion algorithms. Details are not described herein again.

Step 507: Fuse the source image with the target image in a manner of aligning the shape of the formed image of the source object and the shape of the formed image of the target object.

In an optional embodiment of the present application, the foregoing step 507 may be performed in the following manner: superimposing a shape of the source object in an image layer of the source image and a shape of the target object in an image layer of the target image in an aligned manner.

For example, a gray level image of the source image is generated after the shape of the formed image of the source object in the source image is adjusted.

A shape of the source object in an image layer of the gray level image, the shape of the source object in the image layer of the source image, and the shape of the target object in the image layer of the target image are superimposed in an aligned manner.

Color values of pixels at different positions in a superimposed image layer are minimum color values of pixels at corresponding positions in the image layers that are superimposed and are represented as follows: reusltColor=mix (userColor, modelColor, grayColor.a). That is, the minimum color values are minimum values of the color values of the pixels of the image layer in the source image, the color values of the pixels of the image layer in the target image, and the color values of the pixels of the image layer in the gray level image. a is a coefficient and may be set to any value.

It is to be noted that the shape of the source object in the image layer of the source image is the shape, adjusted toward the average shape, of the source object in the source image.

To ensure an effect of facial fusion, in this embodiment of the present application, a facial gray level mask picture is used, to enable smooth transition of a peripheral contour of the face, so as to obtain a final fused face image.

For the facial gray level mask picture, a standard face is selected, where a facial region is changed into black, a background region is changed into white, and a boundary region between the facial region and the background region is black-to-white transition. Because the standard face may be inconsistent with the average face of users in terms of size and angle, a scale-down or scale-up operation, a rotation operation, and a displacement operation that are similar to the foregoing ones need to be performed on feature points of a face in the facial gray level mask picture of the standard face to make the facial gray level mask picture of the standard face and the average face of the user have a same size.

Figure 13:
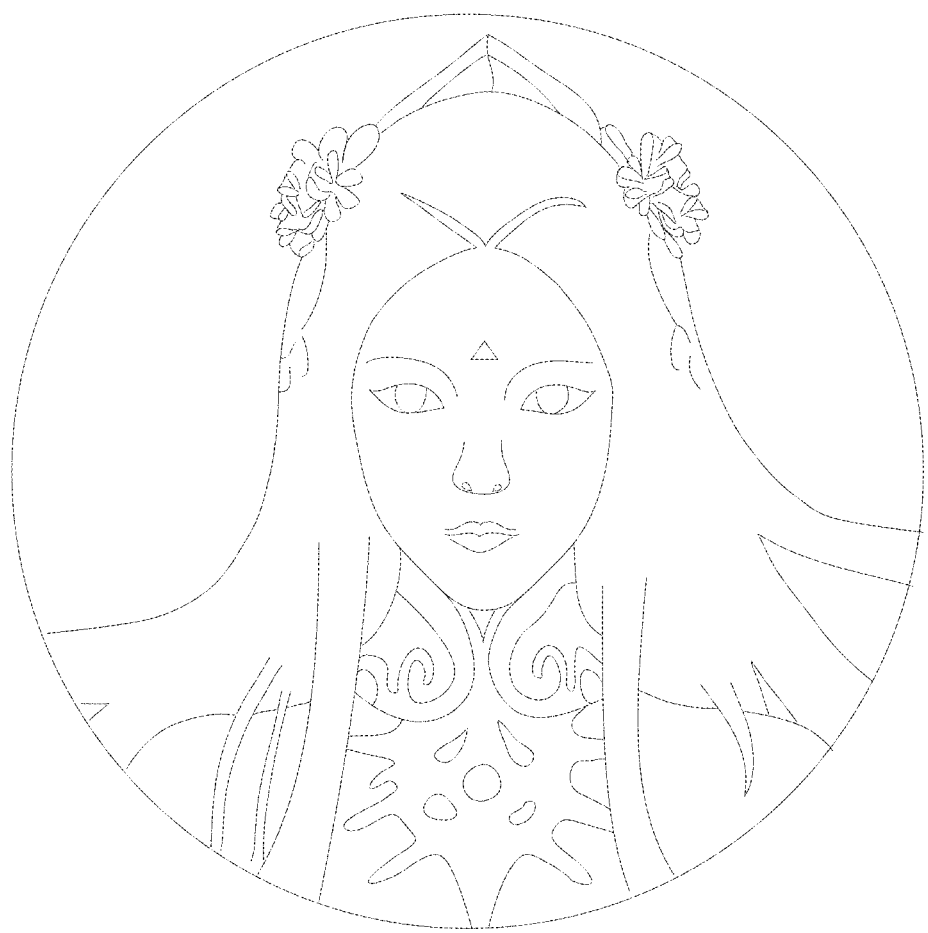
FIG. 13 is a schematic diagram of selecting a target image according to an embodiment of the present application.
Figure 14:
FIG. 14 is a schematic diagram of performing triangle segmentation on a target image according to an embodiment of the present application.
Figure 15:
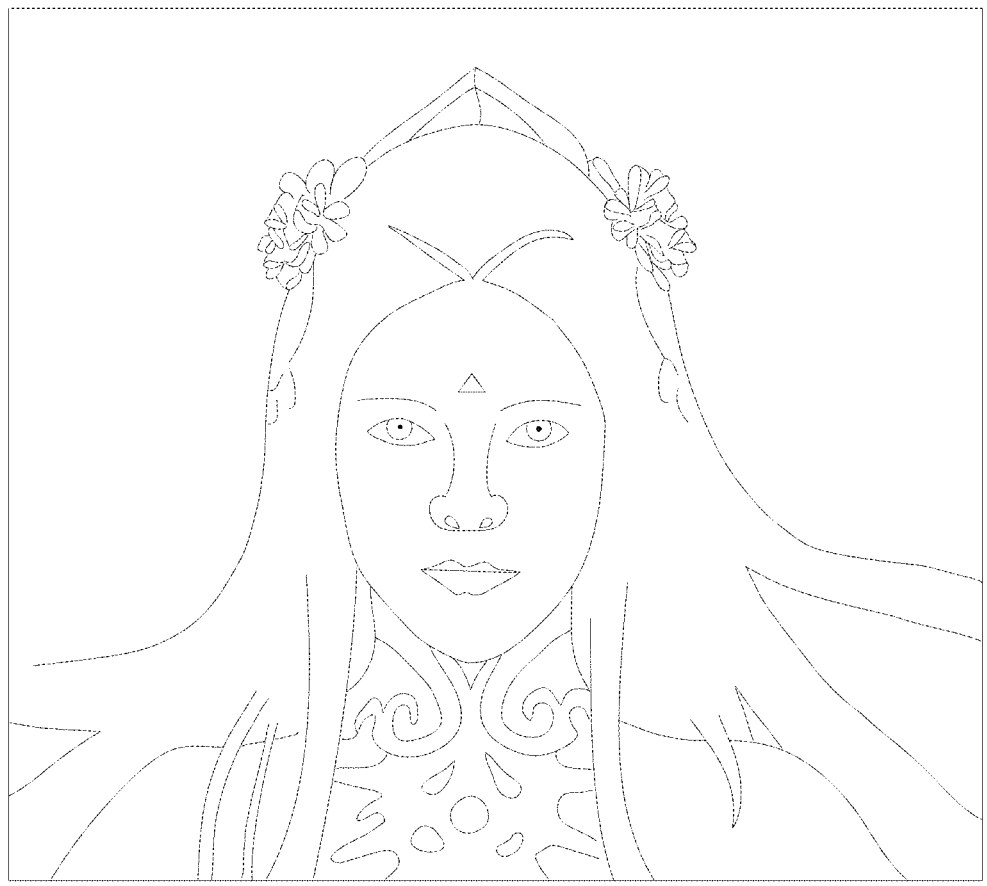
FIG. 15 is a schematic diagram of a fused image according to an embodiment of the present application.

To express technical effects of image fusion more clearly, a complete process of image processing is described below by using figures. Referring to FIG. 13, FIG. 13 is a schematic diagram of selecting a target image according to an embodiment of the present application. FIG. 10A is used as a to-be-processed image, namely, a source image. Triangle segmentation is performed on a target image to obtain an effect diagram of performing triangle segmentation on a target image as shown in FIG. 14. Image fusion is performed on the source image and the target image to obtain a schematic diagram of a fused image as shown in FIG. 15.

Figure 16:
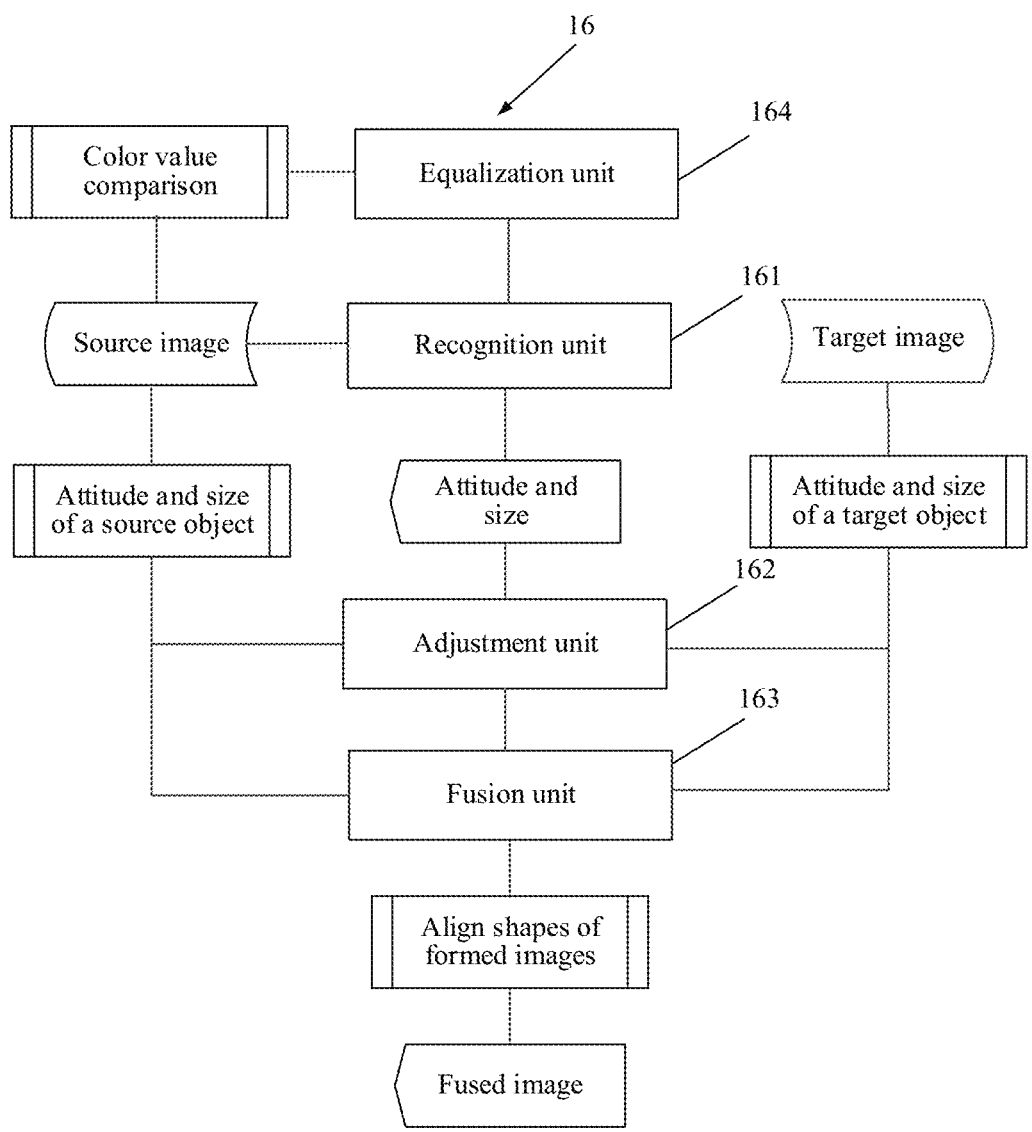
FIG. 16 is a schematic diagram of an optional functional structure of an image processing apparatus according to an embodiment of the present application.

The embodiments of the present application further provide an image processing apparatus. Referring to FIG. 16, FIG. 16 is a schematic diagram of an optional functional structure of an image processing apparatus according to an embodiment of the present application. An image processing apparatus 16 includes a recognition unit 161, an adjustment unit 162, a fusion unit 163, and an equalization unit 164. Functions of the respective units are described below.

The recognition unit 161 is configured to recognize a source object in a source image, and determine, according to feature points of the source object, an orientation and a size of a formed image of the source object in the source image.

With regard to recognizing the source object in the source image, the recognition unit 161 extracts a feature in at least one dimension from the source image, and matches the extracted feature with an object feature template; and determines that a source object matching the feature template exists in the source image in a case that a similarity exceeds an object feature similarity threshold.

With regard to recognizing the orientation of the formed image of the source object in the source image according to the feature points of the source object, the recognition unit 161 matches the feature points of the source object with feature points of different orientation template; and determines that the source object has an orientation included in a corresponding orientation template in a case that a similarity exceeds a shape similarity threshold.

The adjustment unit 162 is configured to adjust, according to matching relationships between the orientation and the size of the formed image of the source object in the source image and the orientation and the size of the formed image of the target object in the target image, the orientation and the size of the formed image of the source object in the source image.

The adjustment unit 162 is further configured to adjust a shape of the formed image of the source object in the source image and a shape of the formed image of the target object in the target image according to an average shape of the formed image of the source object and an average shape of the formed image of the target object.

With regard to adjusting, according to the matching relationships between the orientation and the size of the formed image of the source object in the source image and the orientation and the size of the formed image of the target object in the target image, the orientation and the size of the formed image of the source object in the source image, the adjustment unit 162 performs a rotation operation on the formed image of the source object in the source image according to Euler angles of the formed image of the source object in the source image until the Euler angles of the formed image of the source object in the source image are consistent with Euler angles of the formed image of the target object in the target image; and performs a scale-up or scale-down operation on the formed image of the source object in the source image according to the size of the formed image of the source object in the source image until the size is consistent with the size of the formed image of the target object in the target image.

With regard to adjusting the shape of the formed image of the source object in the source image and the shape of the formed image of the target object in the target image according to the average shape of the formed image of the source object and the average shape of the formed image of the target object, the adjustment unit 162 calculates an average position of feature points of a same type of the source object in the source image and the target object in the target image; and adjusts a position of the feature point of the source object in the source image and a position of the feature point of the target object in the target image to match the average position.

For example, the adjustment unit 162 constructs a polygon according to positions of the feature points of the source object in the source image and positions of the feature points of the target object in the target image, and adjusts the constructed polygon for matching.

For example, an average polygon may be formed by connection according to average positions of the respective feature points; then, a polygon is formed by connection according to the feature points of the source object in the source image, and a polygon is formed by connection according to the feature points of the target object in the target image; and subsequently, shapes of the polygons formed by connection are adjusted to be consistent with a shape of the average polygon, so as to achieve an effect of matching the polygons constructed according to the objects with the average polygon.

For another example, the adjustment unit 162 performs affine transformation on a position of the feature point of the source object in the source image and a position of the feature point of the target object in the target image until the positions match the average position.

For example, the adjustment unit 162 performs affine transformation on a formed image of the source object in the source image according to a positional relationship between a position of a feature point included in the average shape and a position of a corresponding feature point of the source object in the source image; and performs affine transformation on a formed image of the target object in the target image according to the positional relationship between the position of the feature point included in the average shape and the position of the corresponding feature point of the target object in the target image.

For another example, the adjustment unit 162 performs a feature point-based image distortion operation on a position of the feature point of the source object in the source image and a position of the feature point of the target object in the target image until the positions match the average position.

The fusion unit 163 is configured to fuse the source image and the target image in a manner of aligning the shape of the formed image of the source object with the shape of the formed image of the target object.

With regard to fusing the source image and the target image in a manner of aligning the shape of the formed image of the source object with the shape of the formed image of the target object, the fusion unit 163 superimposes a shape of the source object in an image layer of the source image and a shape of the target object in an image layer of the target image in an aligned manner.

Color values of pixels at different positions in a superimposed image layer are minimum color values of pixels at corresponding positions in the image layers that are superimposed.

For example, the fusion unit 163 generates a gray level image of the source image after the shape of the formed image of the source object in the source image is adjusted; and then superimposes shape of the source object in an image layer of the gray level image, the shape of the source object in the image layer of the source image, and the shape of the target object in the image layer of the target image in an aligned manner.

The equalization unit 164 is configured to determine a compensation value of a corresponding pixel according to a comparison result of an average color value of the source image and a color value of each to-be-compensated pixel; and perform equalization on color values of respective pixels in the source image according to the compensation value.

With regard to determining a compensation value of a corresponding pixel according to a comparison result of an average color value of the source image and a color value of each to-be-compensated pixel, the equalization unit 164 determines that a compensation value of the to-be-compensated pixel is a product of a reference value and a first compensation coefficient in a case that the color value of the to-be-compensated pixel is greater than the average color value of the source image; and determines that a compensation value of the to-be-compensated pixel is a product of a reference value and a second compensation coefficient in a case that the color value of the to-be-compensated pixel is less than or equal to the average color value of the source image.

The first compensation coefficient and the second compensation coefficient are determined according to a ratio of an original color value to an average color value of the source image. The reference value is determined according to a difference between the average color value of the source image and the average color value of the target image.

In an actual application, the foregoing units may be implemented by a Central Processing Unit (CPU), a Micro Processor Unit (MPU), a DSP, a Field Programmable Gate Array (FPGA), or the like.

It is to be noted that, in a case that the image processing apparatus provided by the embodiments of the present application performs image processing, only division of the foregoing respective program modules is described as an example. In an actual application, the foregoing processing may be assigned to different program modules for completion according to requirements. That is, an internal structure of the apparatus is divided into different program modules to complete the entire or partial processing described above.

In an exemplary embodiment, an embodiment of the present application further provides a storage medium, where an executable program is executed, and in a case that the executable program is executed by the processor, the image processing method provided by the embodiments of the present application, such as the image processing method shown in FIG. 5, is implemented. The storage medium provided in the embodiments of the present application may be a storage medium such as an optical disc, a flash memory, or a magnetic disk, and optionally, may be a non-transitory storage medium.

In conclusion, this embodiment of the present application may produce the following beneficial effects:

1) Before an object in a user image and an object in a material image are fused, an orientation, a size, and a shape of a formed image of a user object in an image are adjusted, to enable features point of the object in the user image to fit feature points of the object in the material image as much as possible, so that a difference between a formed image of the object in the user image and a formed image of the object in the material image is effectively reduced, it is ensured that precision of image fusion can meet use requirements, an effect of real-time fusion is achieved, and operation efficiency is improved.

2) According to an orientation of a formed image of a user object in an image, the user object is rotated, and during process of performing image fusion, consistency between an angle of an object in a user image and an angle of an object in a material image can be ensured, so that a good fusion effect can also be obtained in a case that the user object is not in a frontal orientation, and further an effect of image fusion can be improved.

3) In a case that an orientation of a face is recognized by using Euler angles, orientations of the face in all statuses can be accurately expressed.

4) Equalization is performed on color values of respective pixels in the source image, so that in a process of fusing the object in the source image and the object in the target image, colors of the two can approach each other to a maximum extent to ensure an effect of fusion.

5) To ensure an effect of facial fusion, a facial gray level mask picture is used, to enable smooth transition of a peripheral contour of the face, so as to obtain a final fused face image.

The descriptions above are merely specific embodiment of the present application, but the scope of the present disclosure is not limited thereto, and changes or replacements that can be easily thought of by a person skilled in the art within the scope disclosed by the present disclosure are intended to be covered by the scope of the present disclosure. Therefore, the protection scope of the present disclosure is to be subject to the protection scope of the claims.

What is claimed is:

1. An image processing method performed at a mobile terminal having one or more processors and memory storing programs to be executed by the one or more processors, the method comprising:
   recognizing a source object in a source image;
   determining, according to feature points of the source object, an orientation and a size of a formed image of the source object in the source image;

adjusting the orientation and the size of the formed image of the source object in the source image according to matching relationships between the orientation and the size of the formed image of the source object in the source image and an orientation and a size of a formed image of a target object in a target image;

adjusting a shape of the formed image of the source object in the source image by taking an average shape of the formed image of the source object and the formed image of the target object according to their corresponding feature points, adjusting a shape of the formed image of the target object in the target image by taking the average shape of the formed image of the source object and the formed image of the target object according to their corresponding feature points; and fusing, in real time, the adjusted source image and the adjusted target image into a fused image in a manner of aligning the shape of the formed image of the source object with the shape of the formed image of the target object.

2. The method according to claim 1, wherein the recognizing a source object in a source image comprises:
extracting a feature in at least one dimension from the source image, and matching the extracted feature with an object feature template; and
determining that a source object matching the feature template exists in the source image in a case that a similarity exceeds an object feature similarity threshold.

3. The method according to claim 1, wherein the adjusting the orientation and the size of the formed image of the source object in the source image according to matching relationships between the orientation and the size of the formed image of the source object in the source image and an orientation and a size of a formed image of a target object in a target image comprises:
performing a rotation operation on the formed image of the source object in the source image according to Euler angles of the formed image of the source object in the source image until the Euler angles of the formed image of the source object in the source image are consistent with Euler angles of the formed image of the target object in the target image; and
performing a scale-up or scale-down operation on the formed image of the source object in the source image according to the size of the formed image of the source object in the source image until the size is consistent with the size of the formed image of the target object in the target image.

4. The method according to claim 1, wherein the adjusting a shape of the formed image of the source object in the source image and a shape of the formed image of the target object in the target image comprises:
calculating an average position of feature points of a same type of the source object in the source image and the target object in the target image; and
adjusting a position of the feature point of the source object in the source image and a position of the feature point of the target object in the target image to match the average position.

5. The method according to claim 4, wherein the adjusting a position of the feature point of the source object in the source image and a position of the feature point of the target object in the target image to match the average position comprises:
constructing a polygon according to positions of the feature points of the source object in the source image and positions of the feature points of the target object in the target image, and adjusting the constructed polygon for matching.

6. The method according to claim 5, wherein the constructing a polygon according to positions of the feature points of the source object in the source image and positions of the feature points of the target object in the target image, and adjusting the constructed polygon for matching comprises:
forming an average polygon by connection according to average positions of the respective feature points;
forming a polygon by connection according to the feature points of the source object in the source image and forming a polygon by connection according to the feature points of the target object in the target image; and
adjusting shapes of the polygons formed by connection to be consistent with a shape of the average polygon.

7. The method according to claim 1, wherein the fusing the adjusted source image and the adjusted target image into the fused image in a manner of aligning the shape of the formed image of the source object with the shape of the formed image of the target object comprises:
superimposing a shape of the source object in an image layer of the source image and a shape of the target object in an image layer of the target image in an aligned manner, color values of pixels at different positions in a superimposed image layer being minimum color values of pixels at corresponding positions in the image layers that are superimposed.

8. The method according to claim 7, wherein the superimposing a shape of the source object in an image layer of the source image and a shape of the target object in an image layer of the target image in an aligned manner comprises:
generating a gray level image of the source image after the shape of the formed image of the source object in the source image is adjusted; and
superimposing a shape of the source object in an image layer of the gray level image, the shape of the source object in the image layer of the source image, and the shape of the target object in the image layer of the target image in an aligned manner.

9. The method according to claim 1, further comprising:
determining a compensation value of a corresponding pixel according to a comparison result of an average color value of the source image and a color value of each to-be-compensated pixel; and
performing equalization on color values of respective pixels in the source image according to the compensation value.

10. The method according to claim 9, wherein the determining a compensation value of a corresponding pixel according to a comparison result of an average color value of the source image and a color value of each to-be-compensated pixel comprises:
determining that a compensation value of the to-be-compensated pixel is a product of a reference value and a first compensation coefficient in a case that the color value of the to-be-compensated pixel is greater than the average color value of the source image; or
determining that a compensation value of the to-be-compensated pixel is a product of a reference value and a second compensation coefficient in a case that the color value of the to-be-compensated pixel is less than or equal to the average color value of the source image.

11. A mobile terminal comprising one or more processors, memory coupled to the one or more processors and a plurality of programs stored in the memory that, when executed by the one or more processors, cause the mobile terminal to perform a plurality of operations comprising:
- recognizing a source object in a source image;
- determining, according to feature points of the source object, an orientation and a size of a formed image of the source object in the source image;
- adjusting the orientation and the size of the formed image of the source object in the source image according to matching relationships between the orientation and the size of the formed image of the source object in the source image and an orientation and a size of a formed image of a target object in a target image;
- adjusting a shape of the formed image of the source object in the source image by taking an average shape of the formed image of the source object and the formed image of the target object according to their corresponding feature points,
- adjusting a shape of the formed image of the target object in the target image by taking the average shape of the formed image of the source object and the formed image of the target object according to their corresponding feature points; and
- fusing, in real time, the adjusted source image and the adjusted target image into a fused image in a manner of aligning the shape of the formed image of the source object with the shape of the formed image of the target object.

12. The mobile terminal according to claim 11, wherein the recognizing a source object in a source image comprises:
- extracting a feature in at least one dimension from the source image, and matching the extracted feature with an object feature template; and
- determining that a source object matching the feature template exists in the source image in a case that a similarity exceeds an object feature similarity threshold.

13. The mobile terminal according to claim 11, wherein the adjusting the orientation and the size of the formed image of the source object in the source image according to matching relationships between the orientation and the size of the formed image of the source object in the source image and an orientation and a size of a formed image of a target object in a target image comprises:
- performing a rotation operation on the formed image of the source object in the source image according to Euler angles of the formed image of the source object in the source image until the Euler angles of the formed image of the source object in the source image are consistent with Euler angles of the formed image of the target object in the target image; and
- performing a scale-up or scale-down operation on the formed image of the source object in the source image according to the size of the formed image of the source object in the source image until the size is consistent with the size of the formed image of the target object in the target image.

14. The mobile terminal according to claim 11, wherein the adjusting a shape of the formed image of the source object in the source image and a shape of the formed image of the target object in the target image comprises:
- calculating an average position of feature points of a same type of the source object in the source image and the target object in the target image; and
- adjusting a position of the feature point of the source object in the source image and a position of the feature point of the target object in the target image to match the average position.

15. The mobile terminal according to claim 11, wherein the fusing the adjusted source image and the adjusted target image into the fused image in a manner of aligning the shape of the formed image of the source object with the shape of the formed image of the target object comprises:
- superimposing a shape of the source object in an image layer of the source image and a shape of the target object in an image layer of the target image in an aligned manner, color values of pixels at different positions in a superimposed image layer being minimum color values of pixels at corresponding positions in the image layers that are superimposed.

16. The mobile terminal according to claim 11, wherein the plurality of operations further comprise:
- determining a compensation value of a corresponding pixel according to a comparison result of an average color value of the source image and a color value of each to-be-compensated pixel; and
- performing equalization on color values of respective pixels in the source image according to the compensation value.

17. A non-transitory computer readable storage medium storing a plurality of machine readable instructions in connection with a computing device having one or more processors, wherein the plurality of machine readable instructions, when executed by the one or more processors, cause the computing device to perform a plurality of operations including:
- recognizing a source object in a source image;
- determining, according to feature points of the source object, an orientation and a size of a formed image of the source object in the source image;
- adjusting the orientation and the size of the formed image of the source object in the source image according to matching relationships between the orientation and the size of the formed image of the source object in the source image and an orientation and a size of a formed image of a target object in a target image;
- adjusting a shape of the formed image of the source object in the source image by taking an average shape of the formed image of the source object and the formed image of the target object according to their corresponding feature points,
- adjusting a shape of the formed image of the target object in the target image by taking the average shape of the formed image of the source object and the formed image of the target object according to their corresponding feature points; and
- fusing, in real time, the adjusted source image and the adjusted target image into a fused image in a manner of aligning the shape of the formed image of the source object with the shape of the formed image of the target object.

18. The non-transitory computer readable storage medium according to claim 17, wherein the recognizing a source object in a source image comprises:
- extracting a feature in at least one dimension from the source image, and matching the extracted feature with an object feature template; and
- determining that a source object matching the feature template exists in the source image in a case that a similarity exceeds an object feature similarity threshold.

19. The non-transitory computer readable storage medium according to claim 17, wherein the adjusting the orientation and the size of the formed image of the source object in the source image according to matching relationships between the orientation and the size of the formed image of the source object in the source image and an orientation and a size of a formed image of a target object in a target image comprises:
- performing a rotation operation on the formed image of the source object in the source image according to Euler angles of the formed image of the source object in the source image until the Euler angles of the formed image of the source object in the source image are consistent with Euler angles of the formed image of the target object in the target image; and
- performing a scale-up or scale-down operation on the formed image of the source object in the source image according to the size of the formed image of the source object in the source image until the size is consistent with the size of the formed image of the target object in the target image.

20. The non-transitory computer readable storage medium according to claim 17, wherein the adjusting a shape of the formed image of the source object in the source image and a shape of the formed image of the target object in the target image comprises:
- calculating an average position of feature points of a same type of the source object in the source image and the target object in the target image; and
- adjusting a position of the feature point of the source object in the source image and a position of the feature point of the target object in the target image to match the average position.

* * * * *